July 23, 1968   C. G. MATSON   3,393,571
ECCENTRIC ROLLER VIBRATOR
Filed Jan. 9, 1967
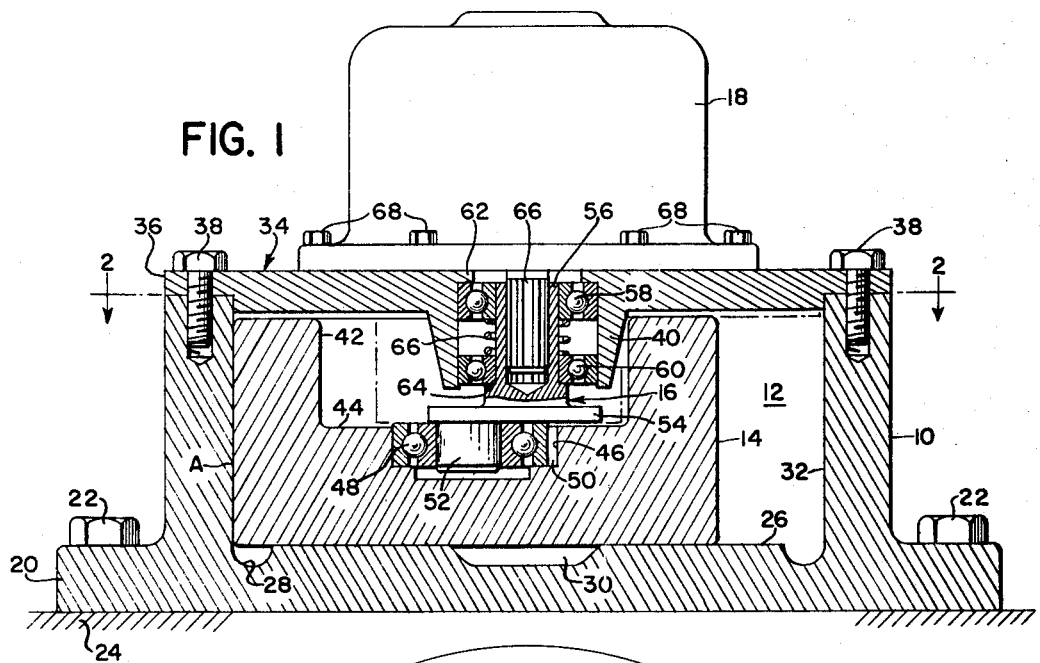
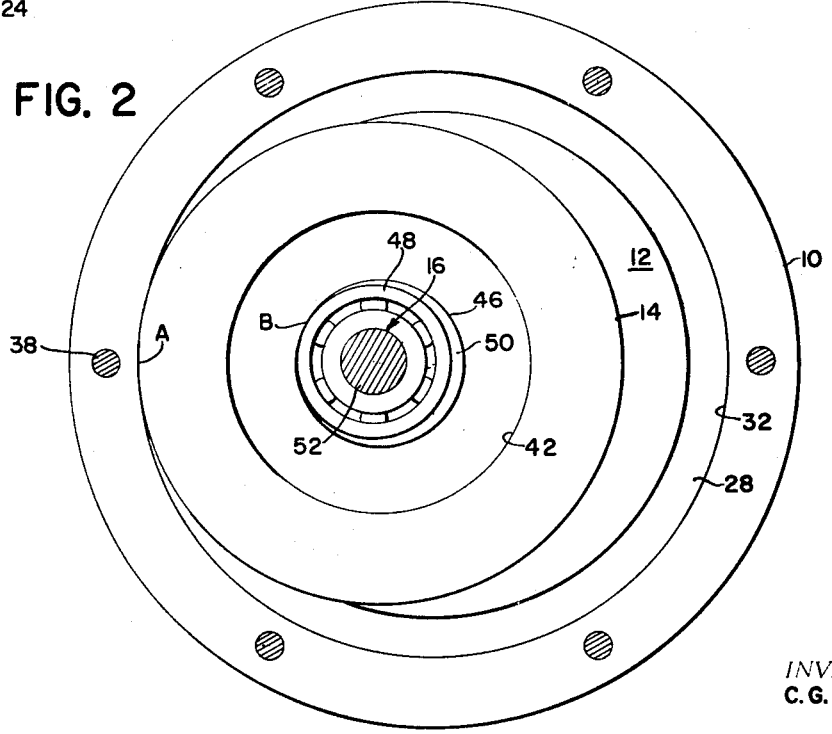
INVENTOR.
C. G. MATSON

3,393,571
ECCENTRIC ROLLER VIBRATOR
Carl G. Matson, 401 E. Central Blvd.,
Kewanee, Ill. 61443
Filed Jan. 9, 1967, Ser. No. 607,986
8 Claims. (Cl. 74—87)

ABSTRACT OF THE DISCLOSURE

A vibrator comprisng a casing having a cylindrical chamber in which a roller is caused to orbit by a rotating crank.

Background of the invention

Vibrators and like mechanism of this general class are well known and various attempts have been made to exploit the general principle of operation by redesign of the casing, crankshaft, roller mounting and drive means. In mechanisms of the larger sizes, the components are naturally larger and heavier and of course the forces generated during operation become greater. It is therefore important that the basic design take into account such factors as adequate strength, ease of manufacture, efficient operation and ease of maintenance and repair.

Summary of the invention

The invention provides improvements in design that result in a compact structure by relative nesting of adjacent parts within each other, principally by employing a roller having its top face cylindrically recessed to accommodate the eccentrically related structure that depends from the casing top wall, in which structure are located the bearings for journaling the upper shaft of the crank that drives the roller. The crank is axially slidably carried by this structure and is biased downwardly to urge the roller downwardly to improve the sliding contact of its undersurface with the floor of the cylindrical chamber in which it orbits. This arrangement also relieves the crank bearings of excessive radial loads because, for one thing, the nesting of the bearing support in the roller recess places the bearings closer to the mass of the roller and enables the use of a crank of shorter axial length. Further, the drive connection between the power source and the upper shaft of the crank is telescopic so as to accomodate floating of the crank. The bearing connection between the roller and the lower shaft of the crank includes radial clearance so that the bearing may shift initially angularly away from the center of the roller in such manner that the point of contact of the bearing with the roller becomes angularly offset from the point of contact of the periphery of the roller with the interior annular surface of the casing chamber. This angular offset is in the direction of orbiting so that the resultant forces required to orbit the roller and the resistance of the roller to move neutralize each other and thus eliminate centrifugal force reactions on the bearings.

Brief description of the drawings

FIGURE 1 is a transverse section; and

FIGURE 2 is a section on the staggered line 2—2 of FIGURE 1.

Description of a preferred embodiment

The disclosure and appended claims proceed, for convenience and clarity, on the basis of a mechanism in which axes of orbiting and rotation are upright and surfaces normal thereto are of course radial, but the mechanism may be otherwise arranged and it is therefore not intended to limit the invention precisely by the disclosure.

The vibrator has a casing 10 formed with a cylindrical chamber 12 in which a circular roller 14 is orbited by a casing-carried crank 16 driven by a power source such as an electric motor 18. The casing 10 has an external flange 20 by means of which it can be secured, as by cap screws 22, to an object to be vibrated, as indicated at 24. The cylindrical chamber 12 has a radial bottom of floor 26, provided with an appropriate lubricant groove 28 and recess 30, and further has an interior annular wall or surface 32 on which the periphery of the roller 14 rolls as it orbits.

The top of the casing carries support means 34, here including a radial wall 36, secured to the casing as by cap screws 38 and having an integral depending tubular structure 40 coaxial of course with the chamber 12. The top of the roller 14 is cut out to provide a cylindrical recess 42 on the roller axis and into which the structure 40 depends, the relative diameters of the two being such that the orbiting roller has ample cleaarnce as respects the structure 40. The wall 36 thus relatively closely overlies the roller and the height of the vibrator is relatively low and the axial length of the crank 16 is relatively short.

The roller recess 42 has a flat bottom 44 in which is coaxially provided a circular pocket 46. A bearing 48 of typical ball and race construction is received in the pocket 46, and the O. D. of the outer race of this bearing is slightly less than the I. D. of the pocket so that a clearance exists at 50. The crank 16 has a lower shaft 52 received by the inner race of the bearing 48 and joined by a check portion 54 to an upper shaft 56 of the crank which is journaled and axially slidably carried within the tubular structure 40 by upper and lower bearings 58 and 60, also of the ball and race type.

The upper portion of the structure 40 has an annular shoulder 62 against which the outer race of the upper bearing is stopped. The outer race of the lower bearing 60 is axially slidable in the structure 40 and the lower bearing inner race abuts a shoulder 64 on the shaft 56. The shaft 56 is axially slidable in the inner race of the upper bearing 58 and the two bearings are biased apart by biasing means, here a coiled compression spring 66 encircling the shaft 56 and acting upwardly against the upper bearing 58 and downwardly on the lower bearing 60 and thus biases the crank downwardly, and the crank acts through the bearing 48 to bias the roller into improved contact with the chamber floor 26. The shaft 56 is preferably hollow and internally splined to coaxially slidably receive a splined power shaft 66 of the motor 18 so that, even though the motor is rigidly mounted on the casing top wall 36, as by cap screws 68, the crank can have relative vertical floating.

Because of the clearance 50, the roller at rest may be out of contact with the chamber surface 32, but as the roller starts and begins to accelerate, it will attain its operating status with its periphery in rolling contact with the annular chamber surface. For purposes of illustration an initial contact will be assumed, as at A (FIGURE 2). As the crank 16 begins to turn, e.g. clockwise as seen in FIGURE 2, the lower shaft 52 carries the bearing 48 into contact with the cylindrical surface of the roller bearing pocket 46 at point B because of the tendency of the roller to lag circumferentially. The bearing 48 achieves this condition because of the larger I.D. of the pocket 46 relative to the O.D. of the bearing 48, leaving the clearance 50 as described above. During orbiting of the roller, this clearance will assume a crescent shape, gradually diminishing circumferentially to point B. It is significant that the angular offset between A and B is such that B is in advance of, or leads, A in the direction of rotation. Thus, as the orbiting roller 14 clings to the wall or surface 32 of the chamber 12 because of centrifugal force, the effects of this force are not transmitted through the bearing 48 to the crank 16 and this relieves the crank bearings 48, 58 and 60 of substantial radial loads. In other words, the effects of centrifugal force are borne by the wall or surface 32 rather than by the crank and its associated bearings.

The improved vibrator design disclosed herein contributes materially to easy and inexpensive manufacture, efficiency and long life in operation and ease of maintenance and repair. It comprises relatively few parts and these are arranged and assembled to provide a sturdy compact construction.

I claim:

1. In an eccentric roller vibrator having a casing provided with a cylindrical chamber including a radial floor and an adjoining interior annular surface, a roller arranged to orbit within the chamber with its under surface bearing on the floor and its periphery rolling on the annular surface, support means carried by the casing in overlying relation to the roller, and drive means carried by the support means for orbiting the roller, the improvement comprising tubular structure carried by the support means coaxially with the chamber, a crank having an upper shaft extending coaxially upwardly into said structure and a lower shaft depending toward the roller, said roller having a central bearing means receiving and journaling said lower shaft, means mounting the upper shaft in the tubular structure for rotation and for axial movement, and spring means acting between the tubular structure and the crank for yieldably urging the crank downwardly.

2. The invention defined in claim 1, including a power source carried by and above the support means and having a power shaft depending coaxially into the tubular structure, and a driving connection between said shaft and the upper shaft portion and including means enabling vertical movement of the crank relative the power shaft.

3. The invention defined in claim 2, in which the upper shaft is tubular and coaxially receives the power shaft.

4. The invention defined in claim 1, in which the means mounting the upper shaft in the tubular structure includes an upper bearing carried by said structure and axially slidably journaling said upper shaft, stop means engaged between said structure and said upper bearing for limiting upward movement of the latter, a lower bearing axially slidably carried by the structure in downwardly spaced relation to the upper bearing and journaling the upper shaft, and abutment means on the crank engaged from above by said lower bearing, and the spring means encircles the upper shaft and acts between said bearing.

5. The invention defined in claim 4, in which the roller has a cylindrical upwardly opening recess coaxially thereof and including a bottom provided with a central circular pocket, the bearing means for the lower shaft is received in said pocket, and the tubular structure depends into said recess, the relative diameters of said structure and recess being such that the roller orbits clear of said structure.

6. The invention defined in claim 5, in which the support means includes a radial wall closely overlying the roller and the tubular structure depends from said wall into the roller recess.

7. The invention defined in claim 1, in which the roller has an upper central portion provided with an upwardly opening circular pocket coaxial on the roller axis and the bearing means journaling the lower shaft of the crank includes a circular member of lesser diameter than the pocket and received in said pocket.

8. The invention defined in claim 1, in which the roller has a cylindrical upwardly opening recess coaxially thereof and including a bottom provided with a central circular pocket, the bearing means for the lower shaft is received in said pocket, and the tubular structure depends into said recess, the relative diameters of said structure and recess being such that the roller orbits clear of said structure.

References Cited

UNITED STATES PATENTS 1,733,373   10/1929   Jubien et al. ---------- 74—87

FOREIGN PATENTS 602,809   3/1960   Italy.
974,621   10/1950   France.

MILTON KAUFMAN, *Primary Examiner.*